Patented Oct. 13, 1936

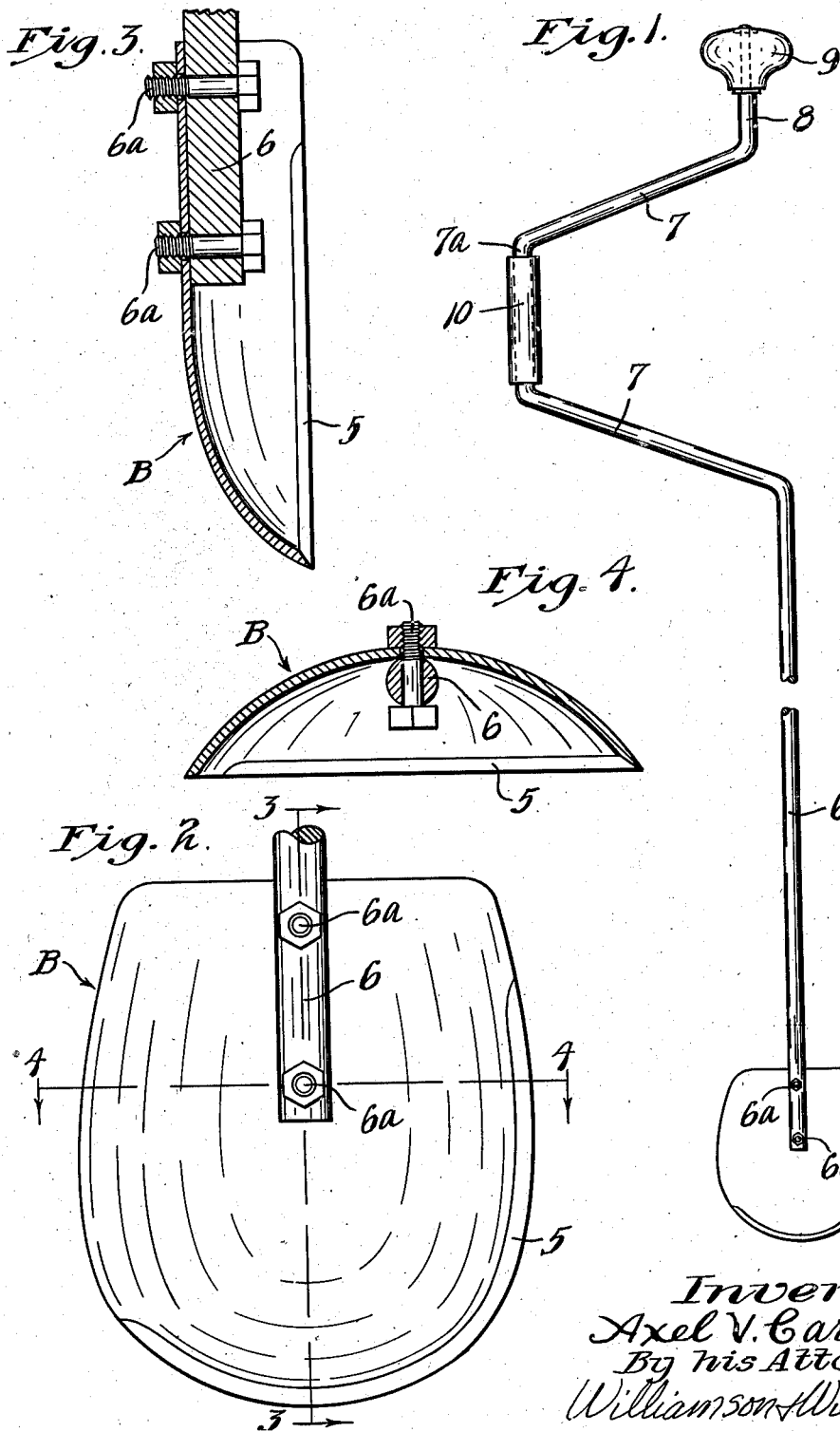

2,057,365

UNITED STATES PATENT OFFICE 2,057,365

ICE AUGER

Axel V. Carlson, Minneapolis, Minn.

Application December 29, 1933, Serial No. 704,464

7 Claims. (Cl. 255—61)

This invention relates to implements for forming holes in a sheet of ice, particularly to augers which will quickly and efficiently drill a hole in ice to facilitate winter fishing.

Fishing through the ice is a popular sport at the present time and the best success is achieved by forming a relatively small, cylindrical hole with slightly greater diameter than the maximum width of the fish caught. Large holes and irregularly shaped holes have a tendency to frighten fish.

It is an object of my invention to provide a simple, inexpensive and highly efficient auger with which cylindrically shaped holes may be quickly drilled in a thick sheet of ice and with which the ice, cut and disintegrated in forming the hole, may be easily removed.

A further object is the provision of an auger of the class described which may be rotated in the manner of a brace and bit and which requires only a minimum of effort to drill relatively hard thick ice.

A more specific object is the provision of an auger, the drilling element of which is in the form of a spoon-shaped blade positioned in drilling with its axis disposed vertically and having at least one of its sides and bottom a sharpened peripheral cutting edge. Not only does the concavo-convex or spoon shape of the drilling element form an efficient means for progressively cutting and boring the ice, but in combination with a shank and handle it forms a convenient spoon or shovel for removing the disintegrated and shaved ice from the liquid contents of the hole formed.

These and other objects and advantages of the invention will be more fully set forth in the following description made in connection with the accompanying drawing, in which like reference characters refer to similar parts throughout the several views, and in which:—

Fig. 1 is a front elevation of an embodiment of my improved ice auger;

Fig. 2 is a front elevation on a larger scale of the auger blade.

Fig. 3 is a vertical section taken longitudinally and axially of the blade on the line 3—3 of Fig. 2; and Fig. 4 is a cross section taken on the line 4—4 of Fig. 2.

As shown in the accompanying drawing, my device comprises a concavo-convex or spoon shaped blade B the axis of which is indicated by the broken section line 3—3. The height of blade B is preferably greater than the width and the sides and bottom of the blade are defined by a continuous curved line. Blade B is preferably not precisely symmetrical in shape, but the cutting edge of the blade is formed on a side which is spaced slightly farther from the axis of rotation than the opposite longitudinal side. The blade may be formed symmetrically but more efficient results will be obtained by the slight extension of one of the longitudinal edges as first described. As shown, the extended longitudinal edge (the right hand edge in the drawing) and the bottom edge of the blade are ground or otherwise beveled at the concave surface of the blade to form a continuous, sharp, ice-cutting edge 5. If desired, the entire curved peripheral edge of the blade may be ground at the concave surface thereof enabling the blade to cut when rotated in either clockwise or counterclockwise direction.

An elongated shank 6 is rigidly secured at its lower edge to the upper portion of blade B preferably on the concave side thereof and extends longitudinally and substantially axially of the blade. The lower end of shank 6 may be secured to blade B in any suitable manner, such as by means of a pair of nutted bolts 6a which extend diametrically through the shank and also through the central portion of the blade. The upper end of shank 6 is formed into a double crank handle 7 in the manner of a brace and the axial extremity 8 of the double crank is provided with a thrust handle 9 rotatively secured thereto. The crank pin 7a of the double crank is provided with a hand-grasp sleeve 10 rotatably mounted thereon.

The combined length of the shank and double crank is preferably from 3 to 5 feet in order that the implement may be conveniently rotated with a downward thrust upon handle 9 and without discomforting the operator.

In operation the lower edge of the blade B is set upon the point of the ice where it is desired to drill. Shank 6 is disposed vertically and the implement is rotated in a clock-wise direction with a downward thrust being imparted to the handle and shank. From time to time as the hole is being drilled, disintegrated ice and shavings may be readily removed by the spoon-shaped blade. The considerable off-set of the double crank 7 from the axis of the implement prevents the implement from dropping through the ice when the hole is completed. Any remaining ice shavings may readily be removed after the completion of the hole by using the blade B as a ladle.

With the use of my device a substantially perfect cylindrical hole of the correct dimensions for successful fishing may be quickly drilled with slight effort. The implement is readily portable and may be stowed in the rear of a motor vehicle. The weight of the elongated shank, double crank, and blade through gravity consists in imparting a downward force or thrust in the drilling operation.

In the drilling operation the unsharpened and slightly narrower edge of the blade is guided by the cut surface formed by the opposite or extended edge, while the cutting edge is projected slightly beyond the orbit of the first mentioned edge. Progressive and successful cutting is thereby assured.

It will, of course, be understood that various changes may be made in the form, details, proportions and arrangement of the parts, without departing from the scope of my invention, which, generally stated, consists in a device capable of carrying out the objects above set forth, in the novel parts and combinations of parts disclosed and defined in the appended claims.

What is claimed is:—

1. An ice auger comprising a spoon-shaped blade having a continuous curved edge extending from one side of its upper end to the opposite side of said upper end, a shank rigidly secured to said blade and extending longitudinally thereof slightly to one side of the longitudinal center line of said blade, thereby leaving a portion of the edge of said blade at one side of said shank disposed a slightly greater distance outwardly of said shank than the portion of said edge at the opposite side of said shank, said first mentioned portion being sharpened to form cutting means, and means at the upper end of said shank for facilitating rotation of said blade on the axis of said shank.

2. An ice auger comprising a spoon-shaped blade of slightly less width than its height, having a continuous curved edge extending from one side of its upper end to the opposite side of said upper end, the lower portion of said edge being of substantially elliptical shape, said edge being sharpened along at least one side and the bottom thereof to form a cutting edge, a shank rigidly secured to said blade and extending longitudinally thereof slightly to one side of the longitudinal center line of said blade and leaving the said sharpened portion of the edge of said blade at one side of said shank disposed a slightly greater distance outwardly of said shank, than the opposite portion of said edge, means at the upper end of said shank for facilitating rotation of said blade on the axis of said shank, said continuously curved edge of said blade being disposed outwardly of the plane of attachment of said shank to form a flange or spoon for removing material from a hole dug in the ice.

3. A drill for ice and the like, comprising a scoop-shaped cutter having a curved cutting edge in a plane substantially parallel with the axis of the hole to be cut, said cutting edge being eccentric to the axis of the cutter, the opposite edges of said cutter converging toward each other above the cutting edge.

4. A drill for ice and the like, comprising a scoop-shaped cutter having a curved cutting edge in a plane substantially parallel with the axis of the hole to be cut, said cutting edge being eccentric to the axis of the cutter and located substantially entirely at one side of said axis, the end of said cutting edge extending around the point of the scoop.

5. A drill adapted, by its rotation, for cutting substantially cylindrical holes in ice and the like, said drill comprising a scoop-shaped cutter having a curved cutting edge in a plane substantially parallel to the axis of rotation thereof, with the cutting edge located substantially entirely on one side of said axis with the end of said cutting edge extending around the tip of the scoop and with the opposite side edges of the scoop remote from the tip converging toward each other in a direction away from the tip.

6. A drill adapted by its rotation for cutting substantially cylindrical holes in ice and the like, said drill comprising a scoop-shaped cutter having a curved cutting edge in a plane substantially coinciding with the axis of rotation thereof, said cutting edge being eccentric to the axis of the cutter, with the cutting edge located substantially entirely on one side of said axis with the end of said cutting edge extending around the tip of the scoop and with the opposite side edges of the scoop remote from the tip converging toward each other in a direction away from the tip.

7. A drill adapted by its rotation for cutting substantially cylindrical holes in ice and the like, said drill comprising a scoop-shaped cutter having a curved lower edge eccentric to the axis of rotation of the cutter, said lower edge having a portion thereof sharpened, with the cutting edge in alignment with the outer surface of said cutter, with the cutting edge located substantially entirely on one side of said axis with the end of said cutting edge extending around the tip of the scoop and with the opposite side edges of the scoop remote from the tip converging toward each other in a direction away from the tip.

AXEL V. CARLSON.